Feb. 7, 1950     S. SCHNELL     2,496,562
BRAKE CYLINDER SUPPORT

Filed Oct. 31, 1946     2 Sheets-Sheet 1

INVENTOR:
STEVE SCHNELL
BY
ATTORNEY.

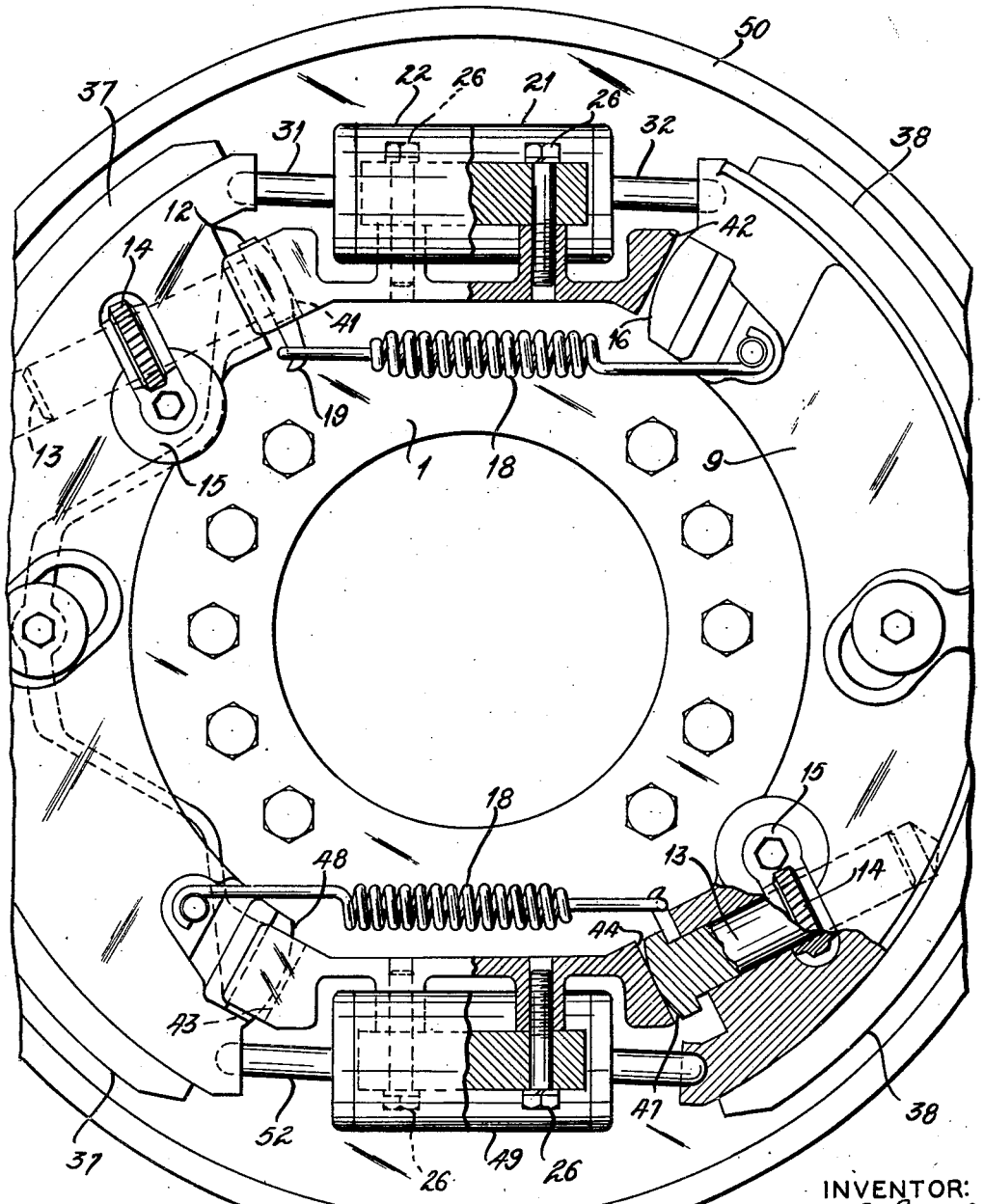

Patented Feb. 7, 1950

2,496,562

UNITED STATES PATENT OFFICE 2,496,562

BRAKE CYLINDER SUPPORT

Steve Schnell, Kirkwood, Mo., assignor to Wagner Electric Corporation, St. Louis, Mo., a corporation of Delaware Application October 31, 1946, Serial No. 706,848

7 Claims. (Cl. 188—152)

This invention relates to automotive brake equipment and in its more specific aspects is directed to means for mounting a plurality of wheel cylinders and shoes on a supporting element.

One of the objects of this invention is to provide a brake assembly wherein the torque of the braking system is not transmitted to the wheel cylinders.

A further object of the invention is to provide a brake assembly spider with means to support a plurality of shoes and other means formed thereon to receive the thrust of the braking effort from the brake shoe ends and in which the spider also provides means for mounting a plurality of wheel cylinders.

In the drawings Figure 1 is an elevational view, partly in section, of the portions of a dual brake assembly;

Fig. 4 shows a plan view, partly in section, of a brake assembly incorporating the invention.

Figure 1:
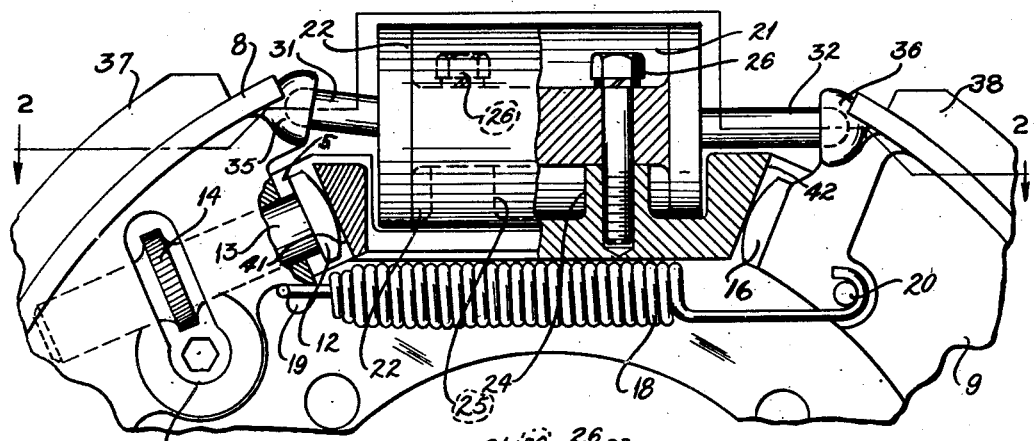
Figure 3:
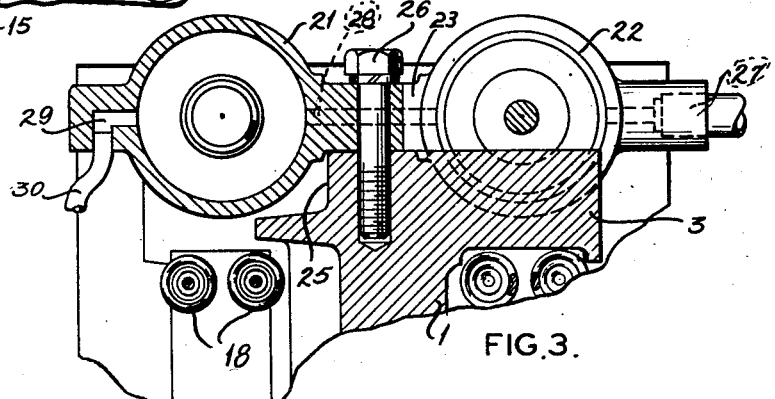
Figure 3 is a sectional view taken substantially along the line 3—3 of Figure 2.

The illustrations show a portion of a dual or multiple brake assembly but sufficient detail is believed disclosed to permit those skilled in the art to fully comprehend the principles of the invention and the merits thereof. The portions and parts not shown are integral in structure with and the same in function as that set forth.

The portion of the brake assembly illustrated comprises a spider 1 on which a plurality of thrust receiving cross-members 2 and 3 are formed which are provided with suitably machined slots 4, 5, 6, and 7, each provided with a suitably machined surface with which the appropriately shaped end portions of shoes 8, 9, 10, and 11 cooperate. Slot 5 receives the head 12 of a thrust element 13 arranged in shoe 8, said thrust element being in the form of an adjustable bolt. The companion shoe 10 also has an adjustable bolt (not shown) provided therein with a head which is received in slot 4. Each of these bolts is adjusted by gear means 14 and 15 suitably supported in the shoes and is more particularly illustrated and described in previously filed application Serial No. 600,920, filed June 27, 1945. A non-adjustable thrust element 16 is formed integrally with shoe 9 and is so shaped as to insure proper engagement with said machined surface in slot 6. Shoe 11 is similarly provided with a non-adjustable thrust element 17 which is receivable in slot 7.

A spring 18 is connected between a hook 19 formed on shoe 8 and a pin 20 secured to shoe 9, said spring serving to maintain the brake shoes in an unapplied position. A spring (not shown) is similarly disposed between shoes 10 and 11 for the same purpose.

A pair of wheel cylinders is disposed between the ends of the brake shoes, each of which actuates a pair of shoes through an associated rod into engagement with a suitable brake drum. The two wheel cylinders 21 and 22 are shown connected together by a bridging member 23. Bosses 24 and 25 are formed on spider 1 and are appropriately machined to receive and engage with a machined surface on the bridging member 23. Screws 26 extend through suitable apertures in bridging member 23 and are threaded into bosses 24 and 25 to rigidly affix the wheel cylinders 21 and 22 to spider 1. An inlet port 27 is formed in a suitable boss provided on one side of the wheel cylinder 22 through which pressure fluid is received from a suitable source of supply for introduction into cylinder 22. Pressure fluid is conducted from cylinder 22 through duct 28 in bridging member 23 to wheel cylinder 21 and is thence conducted through duct 29 formed in one side of wheel cylinder 21 through conduit 30 to supply pressure fluid to a set of similarly constructed and assembled wheel cylinders on the side opposite those illustrated in the drawings. This construction enables the diametrically disposed wheel cylinders to simultaneously actuate the brake shoes 8, 9, 10, and 11 into engagement with the brake drum. The companion set of wheel cylinders may be provided with a bleeder valve to enable entrapped air and fluid to be drained from the wheel cylinder assembly.

Each of the wheel cylinders 21 and 22 is provided with suitable pistons (not shown) and equipped with piston rods 31, 32, 33, and 34 which engage appropriate sockets 35 and 36 formed in the ends of brake shoes 8 and 9 and similarly constructed sockets (not shown) formed in the brake shoes 10 and 11. Force is transmitted through the piston rods to the sockets to urge the shoes into engagement with the brake drum. Each of the shoes is provided with suitable friction elements 37, 38, 39 and 40 as is conventional in the art.

Figure 2:
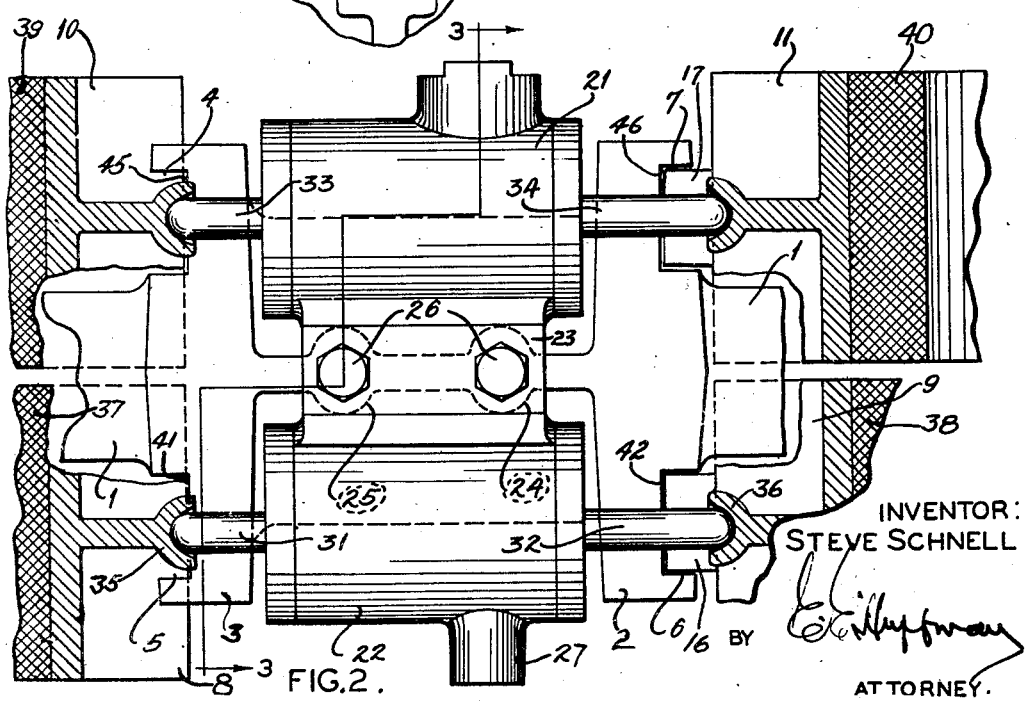
Figure 2 is a view taken substantially along the line 2—2 of Figure 1.

Fig. 4 illustrates the complete brake assembly, including brake drum 50, showing the brake operating means diametrically disposed therein and of similar construction. Two of the radial thrust receiving surfaces 43 and 44 are shown and the two other surfaces are not shown, all of which correspond to the surfaces 41, 42, 45, and 46 illustrated in Fig. 2. The substantially radial surfaces 41, 42, 43 and 44 on the spider 1 serve to provide a bearing surface against which the bolt heads 12, 47 and heads 16, 48 rest when the brake shoes are in their retracted position. Similarly, the corresponding heads associated with brake shoes 10, 11 engage corresponding surfaces in alignment therewith of which surfaces 45, 46 are shown in Figure 2. With the construction shown there is no fixed pivot point around which the brake shoe must operate to move from the retracted to the expanded position. By reason of the radial surfaces 42, 44, the shoe 9, when moved outwardly by the introduction of pressure fluid into the cylinders 22 and 49, comes into contact with the brake drum 50 where such adjustment is automatically made as to bring the maximum amount of surface of the lining 38 in contact with the drum. Upon making contact with the drum through the lining, the shoe tends to rotate in the direction of rotation of the drum and is stopped by contact being made between the curved head 16 and surface 42 and the bolt head 47 coming in contact with the surface 44 depending upon the direction of rotation. In this manner it is possible to produce a brake mechanism which, upon application of pressure fluid to the cylinders, causes the brake shoes to find the most advantageous position with respect to the drum for the transmittal of the retarding force thereto. Due to drum expansion and to lining wear, the point of contact between the bolt head and curved surface and the corresponding surfaces will change from application to application of the brake but will always operate at maximum efficiency under all conditions in either a forward or reverse direction of rotation.

Piston rods 31, 32, 51 and 52 form a pivoted joint with both the brake shoe and the pistons (not shown) in the cylinders 22 and 49, respectively, with which they are associated in order to allow for any adjustment of the shoes with respect to the cylinder. Shoes 10 and 11 and heads and bolt heads corresponding to 12, 16, 47 and 48 on said shoes cooperate with surfaces 45 and 46 and the two surfaces (not shown) diametrically opposite thereto and disposed in back of 43 and 44 in the same manner as those described above. Piston rods 33 and 34 and the two rods for the cylinder diametrically opposite to cylinder 21 likewise cooperate with shoes 10 and 11 in the manner set forth above.

Having fully described my invention, that which I claim as novel and desire to protect by Letters Patent of the United States is:

1. A brake mechanism comprising a spider having bosses formed thereon; a member having two spaced wheel cylinders formed therein and supported on said bosses; means to secure said member to said bosses; and a plurality of abutment means formed on said spider for receiving brake thrust, each abutment means aligned with a wheel cylinder axis.

2. An automotive brake comprising a member having wheel cylinders formed therein; a spider for supporting said member and having a plurality of plane surfaces formed thereon parallel to and substantially radial to the axis of said spider and disposed adjacent each end of each of said wheel cylinders; brake shoes supported on said spider and in engagement with said plane surfaces and in line with the wheel cylinders; and means to support said member on said spider.

3. An automotive brake comprising brake shoes; a supporting means for the brake shoes which includes a plurality of abutments having substantially radial plane surfaces for receiving the thrust from said shoes; a member having a plurality of wheel cylinders formed therein; and means to support said member on said brake shoe supporting means so that the brake shoes are aligned with said abutments.

4. An automotive brake comprising brake shoes; a supporting spider for the brake shoes and provided with substantially radial means on said spider to receive the thrust from the brake shoes; a member having two spaced wheel cylinders formed therein; means on said spider on which to support said member; and means to secure said member to said spider so that said brake shoes are aligned with the cylinders.

5. An automotive brake comprising a spider having bosses formed thereon; brake shoes mounted on said spider; a member having two spaced wheel cylinders formed therein and supported on said bosses; means to secure said member to said bosses; and a plurality of abutment means formed on said spider for receiving brake thrust after said brake shoes are automatically centered, each abutment means aligned with a wheel cylinder.

6. An automotive brake comprising a spider having two pairs of brake shoes associated therewith; abutment means formed on said spider, some of which are contacted by each shoe under any condition of brake application; wheel cylinders mounted on said spider in alignment with the ends of said shoes; and means having convexly curved surfaces thereon and disposed near the ends of said shoes which engage some of said abutment means on said spider.

7. An automotive brake comprising a spider with two pairs of brake shoes associated therewith; brake cylinders mounted adjacent the ends of each shoe; means establishing communication between all cylinders for transmission of pressure fluid thereto; abutment means on said spider engageable by the brake shoes and disposed adjacent the ends of each shoe including substantially radial plane surfaces formed on said abutments; and means having a convexly curved surface formed thereon mounted on each end of each shoe and co-operatively associated with each one of said plane surfaces.

STEVE SCHNELL.

REFERENCES CITED

The following references are of record in the file of this patent:

UNITED STATES PATENTS

| Number | Name | Date |
|---|---|---|
| 1,786,856 | Madden | Dec. 30, 1930 |
| 1,898,108 | White | Feb. 21, 1933 |
| 2,294,293 | Goepfrich | Aug. 25, 1942 |
| 2,319,583 | Chambers | May 18, 1943 |
| 2,382,927 | Whitacre | Aug. 14, 1945 |